(12) United States Patent
Song et al.

(10) Patent No.: US 12,227,610 B2
(45) Date of Patent: Feb. 18, 2025

(54) AQUEOUS DISPERSION COMPRISING POLYURETHANE OR POLYURETHANE-UREA, PREPARATION METHOD THEREFOR AND USE THEREOF

(71) Applicants: WANHUA CHEMICAL GROUP CO., LTD., Shandong (CN); WANHUA CHEMICAL (NINGBO) CO., LTD., Zhejiang (CN); WANHUA CHEMICAL (GUANGDONG) CO., LTD., Guangdong (CN)

(72) Inventors: Zefeng Song, Shandong (CN); Yongjian Sun, Shandong (CN); Xueshun Ji, Shandong (CN); Huiliang Li, Shandong (CN); Yancheng Zhang, Shandong (CN); Yuanyong Wang, Shandong (CN)

(73) Assignees: WANHUA CHEMICAL GROUP CO., LTD., Shandong (CN); WANHUA CHEMICAL (NINGBO) CO., LTD., Zhejiang (CN); WANHUA CHEMICAL (GUANGDONG) CO., LTD., Guangdong (CN)

(*) Notice: Subject to any disclaimer, the term of this patent is extended or adjusted under 35 U.S.C. 154(b) by 426 days.

(21) Appl. No.: 17/772,055

(22) PCT Filed: Nov. 5, 2019

(86) PCT No.: PCT/CN2019/115783
§ 371 (c)(1),
(2) Date: Apr. 26, 2022

(87) PCT Pub. No.: WO2021/087769
PCT Pub. Date: May 14, 2021

(65) Prior Publication Data
US 2022/0363804 A1    Nov. 17, 2022

(51) Int. Cl.
| C08G 18/32 | (2006.01) |
| C08G 18/10 | (2006.01) |
| C08G 18/71 | (2006.01) |
| C08G 18/73 | (2006.01) |
| C08L 75/06 | (2006.01) |
| C09D 175/06 | (2006.01) |
| C09J 175/06 | (2006.01) |

(52) U.S. Cl.
CPC ......... *C08G 18/3221* (2013.01); *C08G 18/10* (2013.01); *C08G 18/714* (2013.01); *C08G 18/73* (2013.01); *C08L 75/06* (2013.01); *C09D 175/06* (2013.01); *C09J 175/06* (2013.01)

(58) Field of Classification Search
CPC .. C08G 18/10; C08G 18/3221; C08G 18/714; C08G 18/73; C09D 175/06; C09J 175/06; C08L 75/06
See application file for complete search history.

(56) References Cited

U.S. PATENT DOCUMENTS

| 3,281,397 A | 10/1966 | Axelrod |
| 4,501,852 A * | 2/1985 | Markusch .......... C08G 18/0819 524/762 |
| 6,084,051 A * | 7/2000 | Blum ................. C08G 18/0823 528/71 |
| 6,310,125 B1 * | 10/2001 | Rayner ............. C08G 18/3281 524/217 |
| 6,774,181 B1 | 8/2004 | Bechara et al. |
| 2004/0019160 A1 | 1/2004 | Dai et al. |
| 2007/0032594 A1 | 2/2007 | Mazanek et al. |
| 2009/0062468 A1 | 3/2009 | Ludewig et al. |
| 2014/0234284 A1 | 8/2014 | Schoenberger et al. |

(Continued)

FOREIGN PATENT DOCUMENTS

| CA | 2272759 A1 | 12/1999 |
| CN | 102216359 A | 10/2011 |
| CN | 102633976 A | 8/2012 |
| CN | 103059703 A | 4/2013 |
| CN | 103087286 A | 5/2013 |
| CN | 103980461 A | 8/2014 |

(Continued)

OTHER PUBLICATIONS

Zhang, et al.: "Preparation and Study on Properties of A Novel Non-Ionic Waterborne Polyurethane," Paint & Coating Ind., 41(6), (2011), pp. 46-50, with English abstract.
Office Action issued on Apr. 21, 2022 by the CIPO in the corresponding Patent Application No. 201911070180.X, with English translation.
Supplementary European Search Report issued on May 3, 2023 in the corresponding patent application No. 19951694.9-1102.
International Search Report issued in PCT/CN2019/115783 on Aug. 6, 2020.

*Primary Examiner* — Michael L Leonard
(74) *Attorney, Agent, or Firm* — NORTON ROSE FULBRIGHT US LLP

(57) ABSTRACT

Aqueous dispersion comprising polyurethane or polyurethane-urea, a preparation method therefor and a use thereof. The polyurethane or polyurethane-urea is prepared by reacting raw materials comprising the following components: a compound having a tertiary amine group and at least one NCO reactive functional group, a polyester polyol having a number average molecular weight of 400 to 5000 and a functionality of 2 to 3, an organic compound having at least two isocyanate groups, a hydrophilic compound having one or more of an ionic group, a potential ionic group and a non-ionic group and having 2 to 3 NCO reactive functional groups, and a mono-functional non-ionic hydrophilic compound having at least one NCO reactive functional group. The aqueous dispersion can be stably stored for a prolonged period of time, and an adhesive prepared from the aqueous dispersion has an improved hydrolysis resistance while maintaining good bonding strength and heat resistance.

10 Claims, No Drawings

(56) References Cited

U.S. PATENT DOCUMENTS

2014/0287152 A1 9/2014 Enkisch-Krug et al.
2019/0300722 A1 10/2019 Bremser et al.

FOREIGN PATENT DOCUMENTS

| | | |
|---|---|---|
| CN | 104031234 A | 9/2014 |
| CN | 106634785 A | 5/2017 |
| CN | 107955126 A | 4/2018 |
| CN | 108250390 A | 7/2018 |
| CN | 109081897 A | 12/2018 |
| CN | 109651588 A | 4/2019 |
| CN | 109679059 A | 4/2019 |
| CN | 109957087 A | 7/2019 |
| CN | 111019087 A | 4/2020 |
| DE | 4410557 A1 | 9/1995 |
| DE | 19954500 A1 | 5/2001 |
| DE | 102009008950 A1 | 8/2010 |
| EP | 792908 A1 | 9/1997 |
| EP | 1272588 A1 | 1/2003 |
| EP | 2110395 A1 | 10/2009 |
| EP | 2332998 A1 | 6/2011 |
| GB | 880665 A | 10/1961 |
| JP | S604515 A | 1/1985 |
| WO | 2005097858 A1 | 10/2005 |
| WO | 2012058534 A1 | 5/2012 |

* cited by examiner

AQUEOUS DISPERSION COMPRISING POLYURETHANE OR POLYURETHANE-UREA, PREPARATION METHOD THEREFOR AND USE THEREOF

CROSS-REFERENCE TO RELATED APPLICATIONS

The present application is a United States national phase under 35 U.S.C. § 371 of International Patent Application No. PCT/CN2019/115783 filed Nov. 5, 2019, which is expressly incorporated herein by reference in its entirety.

TECHNICAL FIELD

The present disclosure belongs to the technical field of polyurethane aqueous dispersions and, in particular, relates to an aqueous dispersion comprising polyurethane or polyurethane-urea, a preparation method therefor and a use thereof.

BACKGROUND

The aqueous dispersions of polyurethane or polyurethane urea have been widely used in various fields such as coatings, adhesives and textile coatings due to their great brushability, excellent initial adhesion and peeling strength and outstanding resistance. When the aqueous dispersion of polyurethane or polyurethane urea is used in adhesives, in order to improve the performance of adhesives, polyester polymer polyols are mainly used for synthesis, and during the processing, use and storage, the ester polymers will be subjected to irreversible hydrolysis reaction due to the action of water vapor and acidic substances in the environment. The cracking and fracture of macromolecules caused by hydrolysis directly lead to the decrease of tensile strength, modulus and hardness of materials and the increase of elongation at break, which further leads to the decrease of bonding strength and the failure of bonding. Therefore, how to efficiently and simply improve the water resistance of waterborne polyurethane or polyurethane-urea has become an urgent problem to be solved by those skilled in the art.

Patent documents DE19954500, DE4410557 or EP792908 provides a method to improve the adhesion performance by introducing carboxylate into an aqueous dispersion of polyurethane or polyurethane urea and then compounding it with carbodiimide, which mainly uses the reaction between carboxylic acid and carbodiimide to increase the crosslinking density and improve the strength of the adhesive. The carboxylate is obtained by adding dimethylolpropionic acid to polyurethane or polyurethane urea and then neutralizing it with tertiary amines. However, the reactivity of the carboxyl group and carbodiimide in the compounding scheme of such an adhesive is low, and the final properties are usually insufficient to satisfy the requirements of the adhesive for hydrolysis resistance at normal temperature.

Patent document EP1272588 describes an adhesive composite comprising at least one crystalline polyester-polyurethane dispersion, a polyacrylate copolymer, a polychloroprene dispersion, a heat-curable resin and a stabilizer (amino alcohol, carbodiimide and magnesium oxide), where the stabilizer used has the function of inhibiting the hydrolysis of polyester in the system and keeping the system stable. However, such a multi-component system is expensive and loses efficacy quickly, which seriously limits its use in real life.

Patent document CN102216359 records that a polyurethane or polyurethane urea aqueous dispersion having a carboxyl group at the terminal, which is obtained by adding monoamino and/or monohydroxy carboxylic acids in the synthesis process, and then the aqueous dispersion is compounded with carbodiimide to form an adhesive. Because of the high activity of the terminal carboxyl group, such an aqueous dispersion can have a rapid crosslinking reaction with carbodiimide, thereby significantly improving the performance of coatings. However, such carboxylic acid will affect the stability of polyurethane or polyurethane urea aqueous dispersion, and the stability of carbodiimide itself is not good, which both are not conducive to the storage of this system.

Patent document CN103980461 records a synthesis method of an aqueous dispersion comprising an epoxy resin crosslinking agent and 1-aminopropyl-2-methylimidazole, in which 1-aminopropyl-2-methylimidazole reacts with a —NCO group in a prepolymer to form a covalent bond hybrid network structure, so as to form a hybrid network structure, and meanwhile, an epoxy resin is introduced to form a crosslinking structure to improve the water resistance of the product. However, the use of a crosslinking agent and the formation of a network structure will affect the activation of products, and then affect the initial adhesion and strength of products.

Patent document CN106634785 records the preparation of an aqueous polyurethane adhesive with good water resistance, which comprises: performing epoxy modification on cotton seed oil and castor oil by using stearic acid, lipase and hydrogen peroxide, after modification, mixing with KH-550 so as to obtain modified oil, performing modification on an aqueous polyurethane emulsion by using the modified oil so as to improve the water resistance of aqueous polyurethane, and finally, mixing substances such as the modified aqueous polyurethane emulsion, a water reducing agent and a crosslinking agent, so as to obtain the aqueous polyurethane adhesive with water resistance. This method has complex process steps and uses more raw materials, which is not conducive to industrial production and control. In addition, a lot of crosslinking agents are used in this patent, which leads to other performance deviations of adhesives.

Although the above patent documents can improve the hydrolysis resistance to a certain extent, they all use crosslinking agents to cross-link the polymer molecules in a web-like structure, and these methods are not suitable for the use of activated products. The activation refers to that after the aqueous dispersion is coated on the substrate, the moisture is removed by heating, and at this temperature, with the activity of polyurethane segments increasing, polyurethane or polyurethane urea changes into a viscoelastic state and then bonds to the substrate. In the polyurethane or polyurethane urea aqueous dispersion, the crosslinking structure reduces the mobility of polyurethane segments and makes it insufficiently activated, thereby affecting the initial adhesion, strength and heat resistance.

Therefore, it is particularly important to explore hydrolysis-resistant polyurethane or polyurethane urea aqueous dispersion which will not affect the initial adhesion, strength and heat resistance of the products during the activation treatment.

SUMMARY

The object of the present disclosure is to, in view of the problems in the existing art in the improvement of the hydrolysis resistance of the polyurethane or polyurethane-urea aqueous dispersion prepared from polyester polyol as raw material, provide a hydrolysis-resistant aqueous dispersion comprising polyurethane or polyurethane-urea, a preparation method therefor and a use thereof. The polyurethane or polyurethane-urea comprised in the aqueous dispersion contains tertiary amine groups in the side chain or main chain. Due to the strong alkalinity of the tertiary amine group, during the storage of the aqueous dispersion, acidic substances in the system can be eliminated, the catalytic effect of acidic substances on the ester polymer is further eliminated, and the hydrolysis rate of the ester polymer is greatly reduced, so that the aqueous dispersion can be stably stored for a prolonged period of time, thereby greatly improving the hydrolysis resistance of the adhesive prepared from the dispersion and maintaining great bonding strength and heat resistance of the adhesive.

To achieve the preceding object, the technical solutions of the present disclosure are described below.

In one aspect of the present disclosure, a hydrolysis-resistant aqueous dispersion comprising polyurethane or polyurethane-urea is provided. The polyurethane or polyurethane-urea comprised in the aqueous dispersion is prepared by reacting raw materials comprising the following components:

(a) a compound having a tertiary amine group and at least one NCO reactive functional group, (b) a polyester polyol having a number average molecular weight of 400 to 5000 and a functionality of 2 to 3, (c) an organic compound having at least two isocyanate groups, (d) a hydrophilic compound having one or more of an ionic group, a potential ionic group and a non-ionic group and having 2 to 3 NCO reactive functional groups, (e) a mono-functional non-ionic hydrophilic compound having at least one NCO reactive functional group, (f) optionally, a compound having 1 to 3 NCO reactive functional groups, and (g) optionally, a blocking agent in the field of isocyanates or an unsaturated compound having a polymerization reactive group.

According to the aqueous dispersion comprising polyurethane or polyurethane-urea provided by the present disclosure, in some examples, based on the total weight (e.g. 100 wt %) of components, the amount of component (a) is 0.02 wt % to 5 wt % (0.04 wt %, 0.08 wt %, 0.1 wt %, 0.5 wt %, 1 wt %, 1.2 wt %, 1.5 wt %, 1.8 wt %, 2 wt %, 2.5 wt %, 3.5 wt %, 4 wt % and 4.5 wt %), preferably 0.05 wt % to 3 wt %;

the amount of component (b) is 5 wt % to 94 wt % (8 wt %, 15 wt %, 20 wt %, 30 wt %, 40 wt %, 50 wt %, 60 wt %, 65 wt %, 74 wt %, 76 wt %, 80 wt % and 85 wt %), preferably 70 wt % to 90 wt %;

the amount of component (c) is 5 wt % to 40 wt % (6 wt %, 10 wt %, 13 wt %, 15 wt %, 18 wt %, 25 wt %, 30 wt % and 35 wt %), preferably 8 wt % to 20 wt %;

the amount of component (d) is 0.2 wt % to 50 wt % (0.4 wt %, 0.8 wt %, 1.5 wt %, 2 wt %, 4 wt %, 8 wt %, 15 wt %, 20 wt %, 30 wt % and 40 wt %), preferably 1 wt % to 5 wt %;

the amount of component (e) is 0.01 wt % to 20 wt % (0.04 wt %, 0.08 wt %, 0.1 wt %, 0.5 wt %, 0.8 wt %, 1 wt %, 1.5 wt %, 2 wt %, 3.5 wt %, 5 wt %, 10 wt % and 15 wt %), preferably 0.5 wt % to 3 wt %;

the amount of component (f) is 0 wt % to 10 wt % (0.01 wt %, 0.1 wt %, 0.4 wt %, 1 wt %, 1.5 wt %, 2 wt %, 2.5 wt %, 3.5 wt %, 5 wt % and 8 wt %), preferably 0.5 wt % to 3 wt %; and the amount of component (g) is 0 wt % to 15 wt % (0.01 wt %, 0.1 wt %, 1 wt %, 2 wt %, 5 wt %, 7 wt %, 10 wt % and 12 wt %), preferably 0 wt % to 8 wt %.

Preferably, the polyurethane or polyurethane-urea comprises a structural unit as shown in Formula (I):

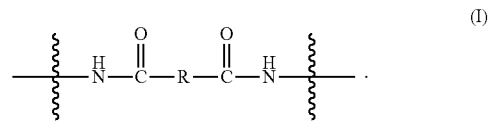

In Formula (I), R is selected from a residue of component (a) after the NCO reactive functional group is removed. For example, R may be residues of compounds such as N-aminoethyl piperazine, N-hydroxyethyl piperazine, N,N-dimethyldiethylenetriamine, N-methyldiethanolamine, N-ethyldiethanolamine, 1,4-bis(aminopropyl) piperazine, N-methylpiperazine, N-ethylpiperazine or N,N-dimethylethanolamine after the NCO reactive functional group is removed. That is, these residues comprise the tertiary amine group.

Preferably, the NCO reactive functional group is selected from one or more of a primary amino group ($-NH_2$), a secondary amino group ($-NH-$), and a hydroxyl group ($-OH$).

Preferably, the component (a) is selected from one or more of N-aminoethyl piperazine, N-hydroxyethyl piperazine, N,N-dimethyldipropylenetriamine, N-methyldiethanolamine, N-ethyldiethanolamine, 1,4-bis(aminopropyl) piperazine, N-methylpiperazine, N-ethylpiperazine, and N,N-dimethylethanolamine, more preferably one or more of N-aminoethyl piperazine, N-hydroxyethyl piperazine, N,N-dimethyldipropylene triamine, N-methyldiethanolamine, N-ethyldiethanolamine, and 1,4-bis(aminopropyl) piperazine.

A suitable polyester polyol in the component (b) may be a straight chain polyester diol or a micro-branched chain polyester diol (comprising a small amount of polyester polyol having a functionality of greater than 3), such as those obtained by dehydration and condensation of carboxylic acids or anhydrides (e.g. aliphatic dicarboxylic acid or polycarboxylic acid, alicyclic dicarboxylic acid or polycarboxylic acid, aromatic dicarboxylic acid or polycarboxylic acid, or corresponding anhydrides thereof) and polyols through the known means. Examples of carboxylic acids or anhydrides described herein include, but are not limited to, succinic acid, methyl succinic acid, glutaric acid, adipic acid, pimelic acid, octanedioic acid, azelaic acid, sebacic acid, nonanedicarboxylic acid, decanedicarboxylic acid, terephthalic acid, isophthalic acid, phthalic acid, tetrahydrophthalic acid, hexahydrophthalic acid, cyclohexane dicarboxylic acid, maleic acid, fumaric acid, malonic acid, trimellitic acid, phthalic anhydride, trimellitic anhydride, succinic anhydride or mixtures thereof. Examples of polyols described herein include, but are not limited to, ethylene glycol, diethylene glycol, triethylene glycol, tetraethylene glycol, 1,2-propanediol, dipropylene glycol, tripropylene glycol, tetrapropylene glycol, 1,3-propanediol, 1,4-butanediol, 1,3-butanediol, 2,3-butanediol, 1,5-pentanediol, 1,6-hexanediol, 2,2-dimethyl-1,3-propanediol, 1,4-dihydroxycyclohexane, 1,4-dihydroxymethylcyclohexane, 1,8- octanediol, 1,10-decanediol, 1,12-dodecanediol or mixtures thereof. Optionally, a polyol with higher functionality, such as trimethylolpropane, glycerol or pentaerythritol, may be added in the preparation of the polyester polyol.

The polyester polyol may also be homopolymers or copolymers of lactones, which may be obtained by ring-opening reaction of a lactone or a mixture of lactones with a suitable diol and/or a polyol having a low molecular weight and higher functionality. Suitable examples of lactones described herein include, but are not limited to, butyrolactone, ε-caprolactone, methyl-ε-caprolactone, and mixtures thereof, and the polyol described herein preferably uses 1,4-butanediol, 1,6-hexanediol, 2,2-dimethyl-1,3-propanediol, and mixtures thereof.

In some examples, the component (b) is selected from a straight chain polyester diol having a number average molecular weight of 400 to 5000 and/or a micro-branched chain polyester diol having a number average molecular weight of 400 to 5000.

In some examples, the component (c) is selected from diisocyanate and/or polyisocyanate, preferably diisocyanate (whose structural formula is $Y(NCO)_2$). In the structural formula, Y represents a divalent aliphatic hydrocarbon group having 4 to 12 carbon atoms, a divalent alicyclic hydrocarbon group having 6 to 15 carbon atoms, a divalent aromatic hydrocarbon group having 6 to 15 carbon atoms or a divalent aromatic aliphatic hydrocarbon group having 7 to 15 carbon atoms.

In addition to these simple diisocyanates, polyisocyanates having a functionality of more than 2 isocyanate groups per molecule are also suitable, such as polyisocyanates prepared by simple modification of aliphatic diisocyanates, alicyclic diisocyanates, aromatic aliphatic diisocyanates or aromatic diisocyanates (e.g. polyisocyanates obtained by modification of carbodiimide groups, allophanate groups, isocyanurate groups, urethane groups or biuret groups), and polyisocyanates synthesized from at least two diisocyanates (the synthesized polyisocyanates have the structure of uretidione, isocyanurate, carbamate, allophanate, biuret, carbodiimide, iminooxadiazine dione or oxadiazinetrione).

The diisocyanate in the component (c) may be aliphatic diisocyanates and alicyclic diisocyanates, such as hexamethylene diisocyanate, 1,4-cyclohexane diisocyanate, isophorone diisocyanate, 4,4'-dicyclohexylmethane diisocyanate, 4,4'-dicyclohexylpropane diisocyanate, and mixtures thereof. In a preferred embodiment, the diisocyanate is selected from one or more tetramethylene diisocyanate, pentamethylene diisocyanate, hexamethylene diisocyanate, dodecamethylene diisocyanate, 1,4-cyclohexane diisocyanate, isophorone diisocyanate, 4,4'-dicyclohexylmethane diisocyanate, 4,4'-dicyclohexylpropane diisocyanate, 1,4-phenyl diisocyanate, 2,4-toluene diisocyanate, 2,6-toluene diisocyanate, 4,4'-diphenylmethane diisocyanate, 2,2'-diphenylmethane diisocyanate, 2,4'-diphenylmethane diisocyanate, tetramethylxylene diisocyanate, and p-phenyldimethyl diisocyanate, more preferably one or more of 1,4-cyclohexane diisocyanate, isophorone diisocyanate, and 4,4'-dicyclohexylmethane diisocyanate.

In some preferred embodiments, the component (c) is a mixture of hexamethylene diisocyanate and isophorone diisocyanate, or a mixture of hexamethylene diisocyanate and 4,4'-dicyclohexylmethane diisocyanate. The mass ratio of hexamethylene diisocyanate to isophorone diisocyanate is 1-50:1, preferably 3-10:1, and the mass ratio of hexamethylene diisocyanate to 4,4'-dicyclohexylmethane diisocyanate is 1-50:1, preferably 3-10:1.

The potential ionic group comprised in the component (d) in the present disclosure refers to a functional group having a covalent bond. When a neutralizer is added to the reaction system, as the pH of the solution changes, the potential ionic group is easily converted into corresponding salts. The preferred potential ionic group is an acid group, and the acid group is selected from a carboxyl group —COOH and/or a sulfonic group —$SO_3H$.

The ionic group comprised herein includes a carboxylate radical —COO— and/or a sulfonate radical —$SO_3$—.

The NCO reactive group comprised herein is selected from a hydroxyl group (—COOH) and/or an amino group (e.g. —$NH_2$ and —NH—).

If a compound having a potential ionic group is used as the component (d), a neutralizer may be added before, during or after the dispersion of the NCO-terminated polyurethane prepolymer obtained after the prepolymerization so that the potential ionic group can be neutralized. The addition amount of the neutralizer is such that the potential ionic group partially or completely becomes an ionic group. A suitable neutralizer is, for example, one or more of a primary amine, a secondary amine, a tertiary amine, an alkali metal compound, and an alkaline earth metal compound. Examples of suitable neutralizers include, but are not limited to, ammonia, ethanolamine, diethanolamine, triethanolamine, dimethylethanolamine, 2-amino-2-methyl-1-propanol, morpholine, N-methylmorpholine, dimethylisopropylamine, N-methyldiethanolamine, triethylamine, dimethylcyclohexylamine, ethyldiisopropylamine, sodium hydroxide, potassium hydroxide, lithium hydroxide, and calcium hydroxide. In general, a sufficient neutralizer is added such that the neutralization degree is at least 50%, preferably at least 75%, and not more than 150%, based on the acid groups introduced. When the neutralization degree exceeds 100%, there are free neutralization amines besides 100% ionic salt groups. In particular, the neutralization degree is preferably 95% to 110%.

When a hydrophilic compound having a non-ionic group is used as the component (d), examples of such a hydrophilic compound having a non-ionic group include, but are not limited to, polyether diols, such as homopolymers, copolymers or graft products of styrene oxide, homopolymers, copolymers or graft products of ethylene oxide, homopolymers, copolymers or graft products of propylene oxide, homopolymers, copolymers or graft products of tetrahydrofuran, homopolymers, copolymers or graft products of butene oxide, homopolymers, copolymers or graft products of epichlorohydrin, and dehydration condensation products of polyols or mixtures thereof, as well as polyether diols obtained by alkoxylation reaction of diols, diamines and monoamino alcohols. The number of ethylene oxides in each molecule of the hydrophilic compound having a non-ionic group is 4 to 200, preferably from 12 to 75.

The hydrophilic compound having a non-ionic group may also be a polyfunctional polyethoxy ether, such as those in which pentaerythritol and sugar are used as initiators and the polymerization unit is one or both of propylene oxide and ethylene oxide, preferably ethylene oxide. The number of ethylene oxides in each molecule is 4 to 200, preferably from 12 to 75.

In some examples, the component (d) is selected from one or more of a hydrophilic compound having an ionic group and having 2 to 3 NCO reactive functional groups, a hydrophilic compound having a potential ionic group and having 2 to 3 NCO reactive functional groups, and a hydrophilic compound having a non-ionic group and having 2 to 3 NCO reactive functional groups.

In a preferred embodiment, the hydrophilic compound having an ionic group and having 2 to 3 NCO reactive functional groups and/or the hydrophilic compound having a potential ionic group and having 2 to 3 NCO reactive functional groups are preferably selected from one or more of dihydroxycarboxylic acids and salts thereof, trihydroxycarboxylic acids and salts thereof, dihydroxysulfonic acids and salts thereof, trihydroxysulfonic acids and salts thereof, diaminosulfonic acids and salts thereof, triaminosulfonic acids and salts thereof, diaminocarboxylic acids and salts thereof, and triaminocarboxylic acids and salts thereof, more preferably one or more of dihydroxymethylacetic acid and alkali metal salts thereof and/or ammonium salts thereof, dihydroxymethylpropionic acid and alkali metal salts thereof and/or ammonium salts thereof, dihydroxymethylbutyric acid and alkali metal salts thereof and/or ammonium salts thereof, dihydroxysuccinic acid and alkali metal salts thereof and/or ammonium salts thereof, N-(2-aminoethyl)-2-aminoethanesulfonic acid and alkali metal salts thereof and/or ammonium salts thereof, N-(3-aminopropyl)-2-aminoethanesulfonic acid and alkali metal salts thereof and/or ammonium salts thereof, N-(3-aminopropyl)-3-aminopropanesulfonic acid and alkali metal salts thereof and/or ammonium salts thereof, and N-(2-aminoethyl)-3-aminopropanesulfonic acid and alkali metal salts thereof and/or ammonium salts thereof.

In a preferred embodiment, the hydrophilic compound having a non-ionic group and having 2 to 3 NCO reactive functional groups is a polyether diol, more preferably a polyether diol having a number average molecular weight of 200 to 8000 and a number of ethylene oxides of 4 to 200.

The component (d) is more preferably selected from one or more of an N-(2-aminoethyl)-2-aminoethanesulfonic acid alkali metal salt, a dihydroxymethylpropionic acid ammonium salt, and Ymer™ N-120 of Perstorp Group. For example, the component (d) is N-(2-aminoethyl)-2-aminoethanesulfonic acid sodium.

The component (e) of the present disclosure is a polyethoxy ether having one hydroxyl group or one amino group (e.g. —NH$_2$, —NH—). Examples of the initiator of the polyethoxy ether include, but are not limited to, saturated monohydric alcohols (e.g. methanol, ethanol, n-propanol, isopropanol, n-butanol, isobutanol, sec-butanol, isomeric pentanol, hexanol, octanol, nonanol, n-decanol, n-dodecanol, n-tetradecanol, n-hexadecanol, cyclohexanol, hydroxymethylcyclohexane, and 3-ethyl-3-hydroxymethyloxyheterocycle), unsaturated alcohols (e.g. allyl alcohol, 1,1-dimethyl-allyl alcohol or oleyl alcohol; aromatic alcohols such as phenol, isomeric cresol or hydroxymethylphenol; and aromatic aliphatic alcohols such as benzyl alcohol, anisyl alcohol or cinnamyl alcohol), secondary monoamines (e.g. dimethylamine, diethylamine, dipropylamine, diisopropylamine, di-n-butylamine, diisobutylamine, bis(2-ethylhexyl)-amine, N-methyl-cyclohexylamine, N-methyl-dicyclohexylamine, N-ethyl-cyclohexylamine, or N-ethyl-dicyclohexylamine), and heterocyclic secondary amines (e.g. morpholine, pyrrolidine, and piperidineethyl pyrazole), and the like. Preferably, the initiator is a saturated monohydric alcohol having up to 4 carbon atoms, particularly preferably methanol. The polymerization unit of the polyethoxy ether is propylene oxide and/or ethylene oxide, preferably ethylene oxide. The number of ethylene oxides in each polyethoxy ether molecule is 4 to 200, preferably from 12 to 75.

In some examples, the component (e) is selected from mono-functional polyethoxy ether having a number average molecular weight of 200 to 8000 and a number of ethylene oxides of 4 to 200, preferably polyethylene glycol monomethyl ether having a number average molecular weight of 500 to 3000 and the number of ethylene oxides of 12 to 75.

The structural formula of polyethylene glycol monomethyl ether having a number average molecular weight of 500 to 3000 and the number of ethylene oxides of 12 to 75 is as shown in Formula (II):

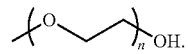

(II)

In Formula (II), n is 12 to 75.

In the component (f), the NCO reactive functional group is selected from one or more of a hydroxyl group, a primary amino group (—NH$_2$), and a secondary amino group (—NH—). In some examples, when the component (f) is a compound having 2 to 3 NCO reactive functional groups, at least one NCO reactive functional group is a primary amino group or a secondary amino group. The component (f), for example, may be selected from aliphatic primary monoamines or aliphatic secondary monoamines and alicyclic primary monoamines or alicyclic secondary monoamines (e.g. ethylamine, diethylamine, isopropylamine, butylamine, and cyclohexylamine). It may also be amino alcohols, i.e. compounds having amino groups and hydroxyl groups in molecules (e.g. ethanolamine, N-methylethanolamine, diethanolamine, diisopropanolamine, 1,3-diamino-2-propanol, N-(2-hydroxyethyl)ethylidenediamine, N,N-bis(2-hydroxyethyl)ethylidenediamine, or 2-propanolamine). It may also be diamines and triamines, such as 1,2-ethylenediamine, 1,6-hexamethylenediamine, 1-amino-3,3,5-trimethyl-5-aminomethylcyclohexane (isophorone diamine), piperazine, 1,4-diaminocyclohexane, bis-(4-aminocyclohexyl)methane, and diethylenetriamine. It may also be special amines, for example, adipate dihydrazide and hydrazine. Mixtures of the above compounds may also be used. In a preferred embodiment, the component (f) is selected from one or more of aliphatic primary monoamines, aliphatic secondary monoamines, alicyclic primary monoamines, alicyclic secondary monoamines, amino alcohols, aliphatic diamines, alicyclic diamines, aliphatic triamines, alicyclic triamines, and hydrazines, preferably one or more of isophorone diamine, N-(2-hydroxyethyl)ethylidenediamine, and 1,6-hexamethylenediamine.

The component (f) may serve as a chain extender to achieve a higher molecular weight or as a mono-functional compound to limit the molecular weight; or other reactive groups may be optionally introduced, for example, free hydroxyl groups, as other crosslinking points.

The component (g) may be a blocking agent (which may be removed at higher temperatures) commonly used in the field of isocyanates, for example, butanone oxime, dimethylpyrazole, caprolactam, malonate, triazole, dimethyltriazole, tert-butyl benzylamine, cyclopentanone carboxyethyl ester; and unsaturated compounds having polymerization reactive groups, for example, hydroxyethyl acrylate, hydroxyethyl methacrylate, hydroxybutyl acrylate, hydroxybutyl methacrylate, hydroxypropyl acrylate, hydroxypropyl methacrylate, and pentaerythritol triacrylate. The blocking agent in the field of isocyanates herein refers to an agent for blocking substances containing mono-functional active hydrogen in active isocyanates.

In a preferred embodiment, the component (g) is selected from one or more of butanone oxime, dimethylpyrazole, caprolactam, malonate, triazole, dimethyltriazole, tert-butyl benzylamine, cyclopentanone carboxyethyl ester, hydroxyethyl acrylate, hydroxyethyl methacrylate, hydroxybutyl acrylate, hydroxybutyl methacrylate, hydroxypropyl acrylate, hydroxypropyl methacrylate, and pentaerythritol triacrylate.

According to the aqueous dispersion comprising polyurethane or polyurethane-urea provided by the present disclosure, in some examples, the aqueous dispersion comprising polyurethane or polyurethane-urea has a solid content of 15 wt % to 70 wt %, preferably 30 wt % to 60 wt %.

In some examples, the aqueous dispersion comprising polyurethane or polyurethane-urea has an average particle size of 20 to nm 750 nm, preferably 50 nm to 450 nm.

Preferably, the aqueous dispersion comprising polyurethane or polyurethane-urea has a pH value of 7.5 to 11, more preferably 7.5 to 10, further preferably 7.5 to 8.5. There is a positive correlation between pH and the content of tertiary amine groups in the aqueous dispersion.

In another aspect of the present disclosure, a method for preparing the aqueous dispersion comprising polyurethane or polyurethane-urea described above is provide. The method includes the following steps:

mixing component (b), component (c), component (e) and optional component (g) in proportion, and performing polymerization reaction to form an isocyanate-terminated polyurethane prepolymer; subjecting the obtained polyurethane prepolymer, component (d) and optionally component (f) to chain extension reaction, and dispersing the mixture obtained after the chain extension reaction in water or adding water into the mixture obtained after the chain extension reaction for dispersing to obtain an aqueous dispersion comprising polyurethane or polyurethane-urea; where the component (d) is a hydrophilic compound having an ionic group or a non-ionic group and having 2 to 3 NCO reactive functional groups, and in the reaction process, the component (a) may be added into the reaction system at any stage for reaction;

or, mixing component (b), component (c), component (d), component (e) and optional component (g) in proportion, and performing polymerization reaction to form an isocyanate-terminated polyurethane prepolymer; subjecting the obtained polyurethane prepolymer and a neutralizer to neutralization reaction, dispersing the mixture obtained after the neutralization reaction in water or adding water into the mixture obtained after the neutralization reaction for dispersing, and adding component (a) before, during or after dispersing for further reaction to obtain an aqueous dispersion comprising polyurethane or polyurethane-urea; wherein the component (d) is a hydrophilic compound having a potential ionic group and having 2 to 3 NCO reactive functional groups.

In the preparation method of the present disclosure, after the component a) is added into the system, no neutralization reaction is carried out to ensure that the prepared polyurethane or polyurethane-urea contains tertiary amine groups.

According to the method for preparing the aqueous dispersion comprising polyurethane or polyurethane-urea provided by the present disclosure, in some examples, a solvent may be added to dilute the system, and the solvent may be partially or completely removed by a distillation operation during or after dispersion. For example, a water-miscible solvent which is inert to isocyanate groups may optionally be added during the reaction. The suitable solvent may be one or more of acetone, methyl isobutyl ketone, butanone, tetrahydrofuran, dioxane, acetonitrile, dipropylene glycol dimethyl ether, and 1-methyl-2-pyrrolidone; they may be added not only at the beginning of the preparation but also during or after the polymerization reaction. The solvent may also add in batches. The solvent is preferably acetone and butanone, more preferably acetone. The optionally used solvent, such as acetone, is distilled during and/or after dispersion.

The preparation method may be carried out in a homogeneous phase in one or more stages or in part in a dispersed phase in the case of a multi-stage reaction. The complete or partial polymerization reaction is followed by steps of dispersing, emulsifying or dissolving. Optionally, addition polymerization or modification may be further carried out in the dispersion phase later.

In some examples, the component (b), the component (c), the component (e) and optional the component (g) are mixed in one-step or multi-step reaction and then subjected to a polymerization reaction to form an isocyanate-terminated polyurethane prepolymer; the resulting prepolymer reacts with the component (a), the component (d) and optional the component (f) in a one-stage or two-stage reaction, and the resulting product is then dispersed with water to obtain an aqueous dispersion comprising polyurethane or polyurethane-urea.

In some examples, the polymerization reaction process is that all or part of components (b), (d), (e) and optional (g) are pre-placed in a reactor, a water-miscible solvent that is inert to isocyanate groups is optionally added for dilution, and then a metered amount of component (c) is added between the room temperature and 120° C. for prepolymerization reaction to obtain an isocyanate-terminated polyurethane prepolymer. Such reaction may be carried out in a single stage or in multiple stages.

The multi-stage reaction may, for example, be that the component (b), the component (c) and the component (e) are pre-placed in a reactor, the component (g) is added after reaction of a part of component (c) completes and then reacts with another part of component (c), and the component (a) may be added at any stage.

During the reaction process, the conversion degree is usually monitored by tracking the NCO content of the reaction mixture. Therefore, spectroscopic measurements (e.g. measurements of infrared or near-infrared spectra and refractive indexes) and chemical potentiometric titration (e.g. chemical titration of samples) may be used for this purpose, preferably chemical potentiometric titration.

During the reaction process, a catalyst may optionally be added. Conventional catalysts may be those known to those of ordinary skill in the art for accelerating the reaction of —NCO with —OH. For example, the catalyst may be one or more of triethylamine, 1,4-diazabicyclo-[2,2,2]-octane, dibutyltin oxide, tin dioctanoate, dibutyltin dilaurate, bis-(2-ethylhexanoate)tin, bismuth neodecanoate, and bismuth 2-ethylhexanoate, preferably bismuth neodecanoate or bismuth 2-ethylhexanoate, more preferably bismuth neodecanoate.

During the reaction process, the temperature of the chain extension reaction stage is usually 10° C. to 100° C., preferably 25° C. to 60° C.

In some preferred embodiments, an aqueous dispersion comprising polyurethane or polyurethane-urea is prepared by the following method: the component (b), the component (c), the component (e) and an optional solvent are pre-added in proportion, mixed and heated to 50° C. to 100° C., with stirring; With an exothermic reaction, the reaction mixture is stirred at 40° C. to 150° C. until the theoretical isocyanate content or the content slightly lower than the theoretical isocyanate content has been reached, an optional component (g) is added, and the reaction continues to reach the theoretical isocyanate content or the content slightly lower than the theoretical isocyanate content. A solvent is added to dilute the solids content to 25 wt % to 95 wt %, preferably 40 wt % to 80 wt %, and then the component (a), the component (d) and optional the component (f) diluted with the solvent are added at 10° C. to 100° C., preferably 25° C. to 60° C., for chain extension. After a reaction time of 2 to 60 minutes, dispersion is carried out by adding distilled water or by transferring the mixture to pre-placed distilled water, all or part of the solvent used is distilled out during or after the dispersion step, and then some additives (e.g. emulsifier Tween 20) are added. A catalyst (e.g. bismuth neodecanoate) may optionally be added to the polymerization reaction.

All methods known from the existing art, such as emulsifier shear force method, acetone method, prepolymer mixing method, melt emulsification method, ketoimine method, and solid spontaneous dispersion method or derivative methods thereof, can be used for the preparation of the aqueous dispersions comprising polyurethane or polyurethane-urea described in the present disclosure. A summary of these methods can be found in Methoden der organischen Chemie (Houben-Weyl, Erweiterungs-und Folgebande zur 4. Auflage, Vol. E20, H. Bartl and J. Falbe, Stuttgart, New York, Thieme 1987, pp. 1671-1682). Melt emulsification method, prepolymer mixing method and acetone method are preferably used. The acetone method is particularly preferred.

In another aspect of the present disclosure, a use of the aqueous dispersion comprising polyurethane or polyurethane-urea described above or an aqueous dispersion comprising polyurethane or polyurethane-urea prepared by the preparation method described above in an adhesive is provided.

The aqueous dispersion comprising polyurethane or polyurethane-urea prepared by the present disclosure can be used alone or in conjunction with known auxiliary substances and additives (in coating and adhesive technology). Commonly used auxiliary substances and additives are, for example, emulsifiers, light stabilizers (e.g. ultra-violet (UV) absorbers and sterically hindered amines (HALS)), antioxidants, fillers, anti-settling agents, defoaming agents, wetting agents, flow control agents, reactive diluents, plasticizers, neutralizers, catalysts, auxiliary solvents, thickeners, pigments, dyes, matting agents, tackifiers, etc.

The auxiliary substances and additives may be added before or after polymerization. Of course, the auxiliary substances and additives may also be added after dispersion.

The prepared aqueous dispersion comprising polyurethane or polyurethane-urea may also be mixed with other aqueous or solvent-containing oligomers or polymers to improve the storage properties of the blending emulsion. These oligomers or polymers are, for example, polyvinyl esters, polyvinyl ethers, polyvinyl alcohols, polyethylenes, polystyrenes, polybutadienes, polyvinyl chlorides, polyurethane, polyurethane-polyureas, polyurethane-polyacrylates, polyesters, and polyacrylates. It is necessary to test the compatibility of such mixtures by simple preliminary tests in each case.

The prepared aqueous dispersion comprising polyurethane or polyurethane-urea and adhesive or binder compositions based thereon are suitable for bonding any substrate. Such substrates are, for example, all types of metals, alloys, wood, wood-based materials, particleboards, MDF boards, ceramics, stone, concrete, asphalt, hard fibers, glass, glass fibers, carbon fibers, carbon nanotubes, porcelains, leathers, textiles, inorganic materials, etc. They are also suitable for bonding rubber materials (e.g. natural rubber and synthetic rubber), various plastics (e.g. polyurethanes, polyvinyl acetates, polyvinyl chlorides, and especially polyvinyl chlorides containing plasticizers). They are also suitable for bonding thermoplastic plastics such as ABS (acrylic-butadiene-styrene), PC (polycarbonate), polyolefin plastics and mixtures thereof.

Adhesives of the prepared aqueous dispersion comprising polyurethane or polyurethane-urea are also suitable for use in products made from the aqueous dispersion. Examples of such products include, but are not limited to, soles, such as soles based on polyvinyl chloride (especially polyvinyl chloride containing plasticizers), soles based on polyethylene vinyl acetate or polyurethane elastomer foams, and adhesion of uppers made of leather or artificial leather. These adhesives are also particularly suitable for bonding films based on polyvinyl chlorides or plasticizer-containing polyvinyl chlorides to wood.

Compared with the existing art, the technical solutions of the present disclosure have beneficial effects described below.

In the aqueous dispersion obtained in the present disclosure, the side or main chains of the polyurethane or polyurethane-urea have segments (i.e. tertiary amine groups) contained in the component (a). In the storage process of the aqueous dispersion, because of the strong alkalinity of the tertiary amine group, the acidic substances in the system can be eliminated, and then the catalytic effect of acidic substances on ester polymers can be eliminated, which can make the aqueous dispersion stably stored. During storage, the tertiary amine group can eliminate acidic substances in the system, greatly reduce the hydrolysis rate of ester polymer, significantly improve the hydrolysis resistance of the adhesive prepared from the dispersion, and maintain good bonding strength and heat resistance of the adhesive.

Compared with the existing waterborne polyurethane-polyurea aqueous dispersion, the aqueous dispersion provided by the present disclosure is used as an adhesive and has excellent hydrolysis resistance. The existing waterborne polyurethane-polyurea aqueous dispersion has hydrolysis resistance within 6 to 10 days (stored at 70° C.), while the hydrolysis resistance of the aqueous dispersion provided by the present disclosure can reach 15 to 20 days (stored at 70° C.).

The existing waterborne polyurethane-polyurea dispersion needs to be added with cross-linking agents such as isocyanate or carbodiimide before use and needs to be mixed according to the ratio before construction, the operation is complicated, the prepared adhesive must be used within a specified time with a short opening time, and the addition of cross-linking agents has a significant reducing effect on the initial adhesion of the adhesive. The aqueous dispersion provided by the present disclosure can satisfy the performance requirements without additional crosslinking agents such as isocyanate or carbodiimide and can be used as a single-component adhesive product, with simple operation and long opening time thereby greatly increasing the construction efficiency.

DETAILED DESCRIPTION

To provide a clearer understanding of technical features and content of the present disclosure, a detailed description of the preferred implementations of the present disclosure will be given below. The examples illustrate the preferred embodiments of the present disclosure, but it should be understood that the present disclosure may be implemented in various ways and should not be limited to the embodiments set forth herein.

<Raw Material Source>

- polyester I: poly (adipic acid-1,4-butanediol ester diol), with OH value=56 mg KOH/g (Wanthanol® WHP-204, Wanhua Chemical);
- polyester II: polyester diol consisting of 1,6-hexanediol, neopentyl glycol and adipic acid, with OH value=74 mg KOH/g (Wanthanol® WHP-1556, Wanhua Chemical);
- polyester III: poly (adipic acid-1,4-butanediol ester diol), with OH value=112 mg KOH/g (Wanthanol® WHP-104, Wanhua Chemical);
- polyester IV: poly (phthalic acid-1,6-hexanediol ester diol), with OH value=56 mg KOH/g (PH-56, Stepan);
- polyester V: polycarbonate diol, with OH value=56 mg KOH/g (PCDL T5652, Asahi Kasei);
- isocyanate I: hexamethylene diisocyanate (Wannate® HDI, Wanhua Chemical);
- isocyanate II: isophorone diisocyanate (Wannate® IPDI, Wanhua Chemical);
- polyether I: mono-functional polyethoxy ether, having an average molecular weight of 1200 g/mol (MPEG1200, LOTTE CHEM),
- polyether II: mono-functional polyethoxy ether, having an average molecular weight of 520 g/mol (MPEG520, LOTTE CHEM);
- bismuth neodecanoate (BiCAT® 8108, Shepferd)
- N-(2-aminoethyl)-2-aminoethanesulfonic acid sodium (Vestamin A95, Evonik);
- N-aminoethyl piperazine (Jinjinloe Chem);
- N,N-dimethyldipropylenetriamine (Hengjingrui Chemical);
- N-ethyldiethanolamine (Hengjingrui Chemical);
- hydroxyethylethylenediamine, i.e., N-(2-hydroxyethyl) ethylidenediamine (BASYPC);
- isophorone diamine (Wanhua Chemical);
- butanone oxime (Jinjinloe Chem); and
- emulsifier Tween 20 (Shanghai Bangjing Industry).

<Detection Method>

Determination of average particle size of aqueous dispersion: Malvern Particle Sizer Nano S90 was used for testing.

Example 1

210 g of dehydrated polyester I, 29 g of isocyanate I, 2 g of dehydrated polyether I, 24 g of acetone and 0.04 g of bismuth neodecanoate were added to a 1 L four-neck round bottom flask equipped with nitrogen inlet and outlet, and the mixture was stirred at 80° C. to 90° C. until NCO reached 2.09%. The resulting prepolymer was dissolved in 400 g of acetone and cooled to 50° C. 35 g of aqueous solution in which 4.63 g of N-(2-aminoethyl)-2-aminoethanesulfonic acid sodium, 2.47 g of N-aminoethyl piperazine and 1 g of hydroxyethylethylenediamine were dissolved was added to an acetone solution in which the prepolymer was dissolved with vigorous stirring. The mixture was stirred for 20 minutes and then dispersed by adding 250 g of water. After acetone was separated by distillation, 4 g of emulsifier Tween 20 was added. Then a solvent-free polyurethane-polyurea aqueous dispersion was obtained, which had a solid content of 50 wt %, an average particle size of 180 nm as measured by laser in the dispersed phase and a pH value of 8.0.

Example 2

150 g of dehydrated polyester I, 53 g of dehydrated polyester II, 29 g of isocyanate I, 24 g of acetone, 0.04 g of bismuth neodecanoate and 2 g of dehydrated polyether II were added to a 1 L four-neck round bottom flask equipped with nitrogen inlet and outlet, and the mixture was stirred at 80° C. to 90° C. until NCO reached 1.94%. The resulting prepolymer was dissolved in 380 g of acetone and cooled to 50° C. 30 g of aqueous solution in which 2 g of N-(2-aminoethyl)-2-aminoethanesulfonic acid sodium, 4 g of N,N-dimethyldipropylenetriamine and 1 g of hydroxyethylethylenediamine were dissolved was added to an acetone solution in which the prepolymer was dissolved with vigorous stirring. The mixture was stirred for 20 minutes and then dispersed by adding 210 g of water. After acetone was separated by distillation, 4 g of emulsifier Tween 20 was added. Then a solvent-free polyurethane-polyurea aqueous dispersion was obtained, which had a solid content of 55 wt %, an average particle size of 220 nm as measured by laser in the dispersed phase and a pH value of 8.2.

Example 3

80 g of dehydrated polyester I, 33 g of dehydrated polyester II, 23 g of dehydrated polyester IV, 2 g of dehydrated polyether I, 22 g of isocyanate I, 18 g of acetone and 0.04 g of bismuth neodecanoate were added to a 1 L four-neck round bottom flask equipped with nitrogen inlet and outlet, and the mixture was stirred at 80° C. to 90° C. until NCO reached 2.13%. The resulting prepolymer was dissolved in 309 g of acetone and cooled to 50° C. 35 g of aqueous solution in which 4.6 g of N-(2-aminoethyl)-2-aminoethanesulfonic acid sodium, 1.5 g of N,N-dimethyldipropylenetriamine and 1 g of hydroxyethylethylenediamine were dissolved was added to an acetone solution in which the prepolymer was dissolved with vigorous stirring. The mixture was stirred for 20 minutes and then dispersed by adding 224 g of water. After acetone was separated by distillation, 4 g of emulsifier Tween 20 was added. Then a solvent-free polyurethane-polyurea aqueous dispersion was obtained, which had a solid content of 45 wt %, an average particle size of 150 nm as measured by laser in the dispersed phase and a pH value of 7.8.

Example 4

60 g of dehydrated polyester I, 77 g of dehydrated polyester II, 35 g of dehydrated polyester III, 29 g of isocyanate I, 2 g of dehydrated polyether I, 25 g of acetone and 0.04 g of bismuth neodecanoate were added to a 1 L four-neck round bottom flask equipped with nitrogen inlet and outlet, and the mixture was stirred at 80° C. to 90° C. until NCO reached 2.05%. The resulting prepolymer was dissolved in 405 g of acetone and cooled to 50° C. 35 g of aqueous solution in which 4 g of N-(2-aminoethyl)-2-aminoethanesulfonic acid sodium, 1 g of isophorone diamine, 1.5 g of N-aminoethyl piperazine and 1 g of hydroxyethylethylenediamine were dissolved was added to an acetone solution in which the prepolymer was dissolved with vigorous stirring. The mixture was stirred for 20 minutes and then dispersed by adding 238 g of water. After acetone was separated by distillation, 4 g of emulsifier Tween 20 was added. Then a solvent-free polyurethane-polyurea aqueous dispersion was obtained, which had a solid content of 50 wt %, an average particle size of 180 nm as measured by laser in the dispersed phase and a pH value of 7.7.

Example 5

120 g of dehydrated polyester I, 72 g of dehydrated polyester II, 29 g of isocyanate I and 2 g of dehydrated polyether I were added to a 1 L four-neck round bottom flask equipped with nitrogen inlet and outlet, and the mixture was stirred at 80° C. to 90° C. until NCO reached 2.15%. The resulting prepolymer was dissolved in 424 g of acetone and cooled to 50° C. 35 g of aqueous solution in which 5 g of N-(2-aminoethyl)-2-aminoethanesulfonic acid sodium, 2 g of isophorone diamine, 1.2 g of N,N-dimethyldipropylenetriamine and 1 g of hydroxyethylethylenediamine were dissolved was added to an acetone solution in which the prepolymer was dissolved with vigorous stirring. The mixture was stirred for 20 minutes and then dispersed by adding 558 g of water. After acetone was separated by distillation, 4 g of emulsifier Tween 20 was added. Then a solvent-free polyurethane-polyurea aqueous dispersion was obtained, which had a solid content of 30 wt %, an average particle size of 164 nm as measured by laser in the dispersed phase and a pH value of 7.7.

Example 6

210 g of dehydrated polyester I, 43 g of isocyanate I and 2 g of dehydrated polyether I were added to a 1 L four-neck round bottom flask equipped with nitrogen inlet and outlet, the mixture was stirred at 80° C. to 90° C. until NCO reached 4.98%, and then 15.2 g of butanone oxime was added at 50° C. until NCO reached 2.20%. The resulting prepolymer was dissolved in 450 g of acetone and cooled to 50° C. 35 g of aqueous solution in which 5 g of N-(2-aminoethyl)-2-aminoethanesulfonic acid sodium, 4.5 g of N-aminoethyl piperazine and 1 g of hydroxyethylethylenediamine were dissolved was added to an acetone solution in which the prepolymer was dissolved with vigorous stirring. The mixture was stirred for 20 minutes and then dispersed by adding 253 g of water. After acetone was separated by distillation, 4 g of emulsifier Tween 20 was added. Then a solvent-free polyurethane-polyurea aqueous dispersion was obtained, which had a solid content of 50 wt %, an average particle size of 180 nm as measured by laser in the dispersed phase and a pH value of 8.3.

Example 7

210 g of dehydrated polyester I, 20 g of isocyanate I, 11.1 g of isocyanate II, 2 g of dehydrated polyether I, 24 g of acetone and 0.04 g of bismuth neodecanoate were added to a 1 L four-neck round bottom flask equipped with nitrogen inlet and outlet, and the mixture was stirred at 80° C. to 90° C. until NCO reached 1.98%. The resulting prepolymer was dissolved in 405 g of acetone and cooled to 50° C. 35 g of aqueous solution in which 4.8 g of N-(2-aminoethyl)-2-aminoethanesulfonic acid sodium, 3 g of N-aminoethyl piperazine and 1 g of hydroxyethylethylenediamine were dissolved was added to an acetone solution in which the prepolymer was dissolved with vigorous stirring. The mixture was stirred for 20 minutes and then dispersed by adding 241 g of water. After acetone was separated by distillation, 4 g of emulsifier Tween 20 was added. Then a solvent-free polyurethane-polyurea aqueous dispersion was obtained, which had a solid content of 50 wt %, an average particle size of 176 nm as measured by laser in the dispersed phase and a pH value of 8.

Example 8

170 g of dehydrated polyester I, 29 g of isocyanate I, 4 g of N-hydroxyethyl piperazine, 2 g of dehydrated polyether I, 24 g of acetone and 0.02 g of bismuth neodecanoate were added to a 1 L four-neck round bottom flask equipped with nitrogen inlet and outlet, and the mixture was stirred at 80° C. to 90° C. until NCO reached 2.05%. The resulting prepolymer was dissolved in 419 g of acetone and cooled to 50° C. 35 g of aqueous solution in which 4.5 g of N-(2-aminoethyl)-2-aminoethanesulfonic acid sodium, 2.5 g of isophorone diamine and 1 g of hydroxyethylethylenediamine were dissolved was added to an acetone solution in which the prepolymer was dissolved with vigorous stirring. The mixture was stirred for 20 minutes and then dispersed by adding 300 g of water. After acetone was separated by distillation, 4 g of emulsifier Tween 20 was added. Then a solvent-free polyurethane-polyurea aqueous dispersion was obtained, which had a solid content of 40 wt %, an average particle size of 195 nm as measured by laser in the dispersed phase and a pH value of 7.9.

Example 9

210 g of dehydrated polyester I, 32 g of isocyanate I, 3 g of N-ethyldiethanolamine, 2 g of dehydrated polyether I, 24 g of acetone and 0.04 g of bismuth neodecanoate were added to a 1 L four-neck round bottom flask equipped with nitrogen inlet and outlet, and the mixture was stirred at 80° C. to 90° C. until NCO reached 1.92%. The resulting prepolymer was dissolved in 413 g of acetone and cooled to 50° C. 35 g of aqueous solution in which 4.63 g of N-(2-aminoethyl)-2-aminoethanesulfonic acid sodium and 1 g of hydroxyethylethylenediamine were dissolved was added to an acetone solution in which the prepolymer was dissolved with vigorous stirring. The mixture was stirred for 20 minutes and then dispersed by adding 300 g of water. After acetone was separated by distillation, 4 g of emulsifier Tween 20 was added. Then a solvent-free polyurethane-polyurea aqueous dispersion was obtained, which had a solid content of 40 wt %, an average particle size of 195 nm as measured by laser in the dispersed phase and a pH value of 8.

Example 10

190 g of dehydrated polyester I, 12 g of dehydrated polyester V, 20 g of isocyanate I, 11 g of isocyanate II, 2 g of dehydrated polyether I, 23 g of acetone and 0.04 g of bismuth neodecanoate were added to a 1 L four-neck round bottom flask equipped with nitrogen inlet and outlet, and the mixture was stirred at 80° C. to 90° C. until NCO reached 2.15%.

The resulting prepolymer was dissolved in 400 g of acetone and cooled to 50° C. 35 g of aqueous solution in which 4.63 g of N-(2-aminoethyl)-2-aminoethanesulfonic acid sodium, 3.2 g of N-aminoethyl piperazine and 1 g of hydroxyethylethylenediamine were dissolved was added to an acetone solution in which the prepolymer was dissolved with vigorous stirring. The mixture was stirred for 20 minutes and then dispersed by adding 238 g of water. After acetone was separated by distillation, 4 g of emulsifier Tween 20 was added. Then a solvent-free polyurethane-polyurea aqueous dispersion was obtained, which had a solid content of 50 wt %, an average particle size of 165 nm as measured by laser in the dispersed phase and a pH value of 8.5.

Example 11

190 g of dehydrated polyester I, 20 g of dehydrated polyester V, 20 g of isocyanate I, 13 g of isocyanate II, 2 g of dehydrated polyether I, 23 g of acetone and 0.04 g of bismuth neodecanoate were added to a 1 L four-neck round bottom flask equipped with nitrogen inlet and outlet, and the mixture was stirred at 80° C. to 90° C. until NCO reached 2.05%. The resulting prepolymer was dissolved in 400 g of acetone and cooled to 50° C. 35 g of aqueous solution in which 4.63 g of N-(2-aminoethyl)-2-aminoethanesulfonic acid sodium, 3.2 g of N-aminoethyl piperazine and 1 g of hydroxyethylethylenediamine were dissolved was added to an acetone solution in which the prepolymer was dissolved with vigorous stirring. The mixture was stirred for 20 minutes and then dispersed by adding 238 g of water. After acetone was separated by distillation, 4 g of emulsifier Tween 20 was added. Then a solvent-free polyurethane-polyurea aqueous dispersion was obtained, which had a solid content of 50 wt %, an average particle size of 178 nm as measured by laser in the dispersed phase and a pH value of 8.3.

Example 12

80 g of dehydrated polyester I, 120 g of dehydrated polyester II, 30 g of dehydrated polyester III, 28.35 g of isocyanate I, 2 g of dehydrated polyether I, 25 g of acetone and 0.04 g of bismuth neodecanoate were added to a 1 L four-neck round bottom flask equipped with nitrogen inlet and outlet, and the mixture was stirred at 80° C. to 90° C. until NCO reached 1.92%. The resulting prepolymer was dissolved in 395 g of acetone and cooled to 50° C. 35 g of aqueous solution in which 5 g of N-(2-aminoethyl)-2-aminoethanesulfonic acid sodium, 3 g of N,N-dimethyldipropylenetriamine and 1 g of hydroxyethylethylenediamine were dissolved was added to an acetone solution in which the prepolymer was dissolved with vigorous stirring. The mixture was stirred for 20 minutes and then dispersed by adding 238 g of water. After acetone was separated by distillation, 4 g of emulsifier Tween 20 was added. Then a solvent-free polyurethane-polyurea aqueous dispersion was obtained, which had a solid content of 50 wt %, an average particle size of 185 nm as measured by laser in the dispersed phase and a pH value of 8.

Example 13

210 g of dehydrated polyester I, 20 g of isocyanate I, 11.1 g of isocyanate II, 2 g of dehydrated polyether I, 24 g of acetone and 0.04 g of bismuth neodecanoate were added to a 1 L four-neck round bottom flask equipped with nitrogen inlet and outlet, and the mixture was stirred at 80° C. to 90° C. until NCO reached 1.98%. The resulting prepolymer was dissolved in 405 g of acetone and cooled to 50° C. 35 g of aqueous solution in which 4.8 g of N-(2-aminoethyl)-2-aminoethanesulfonic acid sodium, 0.12 g of N-aminoethyl piperazine and 2.5 g of hydroxyethylethylenediamine were dissolved was added to an acetone solution in which the prepolymer was dissolved with vigorous stirring. The mixture was stirred for 20 minutes and then dispersed by adding 241 g of water. After acetone was separated by distillation, 4 g of emulsifier Tween 20 was added. Then a solvent-free polyurethane-polyurea aqueous dispersion was obtained, which had a solid content of 50 wt %, an average particle size of 176 nm as measured by laser in the dispersed phase and a pH value of 7.2.

Example 14

180 g of dehydrated polyester I, 20 g of isocyanate I, 11.1 g of isocyanate II, 7 g of dehydrated polyether I, 24 g of acetone and 0.04 g of bismuth neodecanoate were added to a 1 L four-neck round bottom flask equipped with nitrogen inlet and outlet, and the mixture was stirred at 80° C. to 90° C. until NCO reached 2.5%. The resulting prepolymer was dissolved in 405 g of acetone and cooled to 50° C. 35 g of aqueous solution in which 1 g of N-(2-aminoethyl)-2-aminoethanesulfonic acid sodium and 6.9 g of N-aminoethyl piperazine were dissolved was added to an acetone solution in which the prepolymer was dissolved with vigorous stirring. The mixture was stirred for 20 minutes and then dispersed by adding 241 g of water. After acetone was separated by distillation, 4 g of emulsifier Tween 20 was added. Then a solvent-free polyurethane-polyurea aqueous dispersion was obtained, which had a solid content of 50 wt %, an average particle size of 176 nm as measured by laser in the dispersed phase and a pH value of 8.9.

Comparative Example 1

210 g of dehydrated polyester I, 28.35 g of isocyanate I, 2 g of dehydrated polyether I, 24 g of acetone and 0.04 g of bismuth neodecanoate were added to a 1 L four-neck round bottom flask equipped with nitrogen inlet and outlet, and the mixture was stirred at 80° C. to 90° C. until NCO reached 1.72%. The resulting prepolymer was dissolved in 405 g of acetone and cooled to 50° C. 35 g of aqueous solution in which 5.1 g of N-(2-aminoethyl)-2-aminoethanesulfonic acid sodium, 3.51 g of isophorone diamine and 0.86 g of hydroxyethylethylenediamine were dissolved was added to an acetone solution in which the prepolymer was dissolved with vigorous stirring. The mixture was stirred for 20 minutes and then dispersed by adding 300 g of water. After acetone was separated by distillation, 4 g of emulsifier Tween 20 was added. Then a solvent-free polyurethane-polyurea aqueous dispersion was obtained, which had a solid content of 50 wt %, an average particle size of 180 nm as measured by laser in the dispersed phase and a pH value of 7.0.

Comparative Example 2

210 g of dehydrated polyester I, 20 g of isocyanate I, 11.1 g of isocyanate II, 2 g of dehydrated polyether I, 24 g of acetone and 0.04 g of bismuth neodecanoate were added to a 1 L four-neck round bottom flask equipped with nitrogen inlet and outlet, and the mixture was stirred at 80° C. to 90° C. until NCO reached 1.98%. The resulting prepolymer was dissolved in 405 g of acetone and cooled to 50° C. 35 g of aqueous solution in which 4.8 g of N-(2-aminoethyl)-2-aminoethanesulfonic acid sodium, 0.02 g of N-aminoethyl piperazine and 2.6 g of hydroxyethylethylenediamine were dissolved was added to an acetone solution in which the prepolymer was dissolved with vigorous stirring. The mixture was stirred for 20 minutes and then dispersed by adding 241 g of water. After acetone was separated by distillation, 4 g of emulsifier Tween 20 was added. Then a solvent-free polyurethane-polyurea aqueous dispersion was obtained, which had a solid content of 50 wt %, an average particle size of 176 nm as measured by laser in the dispersed phase and a pH value of 7.0.

The particle size and pH value data of polyurethane or polyurethane-urea aqueous dispersions prepared in each example show that the PUD dispersion has been successfully synthesized, because the significant change after the segments containing tertiary amine groups are introduced to the aqueous dispersion comprising polyurethane or polyurethane-urea is the increase of the pH value, in which the pH value of the dispersion having tertiary amine groups is between 7.5 and 8.9 while the pH value of the dispersion containing no or trace tertiary amine group is basically 7.0.

The content of tertiary amino group is low in the whole polyurethane system, which cannot be characterized by conventional wave spectrum method. Since the component (a) having tertiary amine groups has groups that can react with NCO and NCO groups are excessive, it is believed that tertiary amine groups can be linked to polyurethane or polyurethane urea molecular chains.

Preparation of Adhesive 100 g of the aqueous dispersion obtained in each Example and Comparative Example was mixed with 0.05 g of BYK024 (BYK Chemical), stirred at 500 rpm for 5 minutes, then added with 0.2 g of Tego 245 (TEGO), stirred for 5 minutes, then added with 0.15 g of Vesmody U604 (Wanhua Chemical), and then stirred at 600 rpm for 10 minutes to obtain each adhesive corresponding to each Example and Comparative Example.

Preparation and Testing of Test Samples for Detection (1) The test samples using the composite materials in Table 1 for detection:

| Composite material | Substrate 1 | Substrate 2 |
|---|---|---|
| A | Rubber | Rubber |
| B | Canvas | Canvas |
| C | PVC | PVC |

First, the substrate 1 (rubber) and the substrate 2 (rubber) were polished. The prepared adhesive was then carefully and thinly applied with a brush to a substrate strip 2.5 cm wide and 15 cm long, dried in an oven at 65° C. for 3 minutes, then removed from the oven, and pressed by a hot press for 10 seconds under a condition of 30 kg/cm² to obtain the composite material A.

The composite material B and the composite material C were prepared by the same method described above.

(2) Test of Peel Strength of Composite Materials

The peel strength was measured by a tensile machine produced by GOTECH at a peel rate of 200 mm/min. Initial strength: after pressed, the composite material was directly tested on the tensile machine to test its peel strength. Later strength: after the test sample was placed at room temperature for 24 hours and then tested for its peel strength. The test results are shown in Table 2.

TABLE 2

Peel strength of adhesives on different substrates

| Composition | Initial peel strength N/mm | | | Later peel strength N/mm | | |
|---|---|---|---|---|---|---|
| material | A | B | C | A | B | C |
| Example 1 | 5.9 | 4.2 | 4.6 | 12.1 | 7.7 | 8.2 |
| Example 2 | 5.5 | 3.8 | 4.4 | 11.8 | 7.2 | 8.0 |

TABLE 2-continued

Peel strength of adhesives on different substrates

| Composition | Initial peel strength N/mm | | | Later peel strength N/mm | | |
|---|---|---|---|---|---|---|
| material | A | B | C | A | B | C |
| Example 3 | 5.6 | 4.0 | 4.9 | 11.9 | 7.6 | 8.1 |
| Example 4 | 5.7 | 4.1 | 4.5 | 12.0 | 7.5 | 8.0 |
| Example 5 | 5.3 | 3.7 | 4.6 | 11.4 | 7.2 | 7.9 |
| Example 6 | 6.1 | 4.4 | 4.7 | 12.1 | 7.5 | 8.0 |
| Example 7 | 5.7 | 4.0 | 4.6 | 12.1 | 7.6 | 8.4 |
| Example 8 | 5.2 | 3.9 | 4.0 | 11.5 | 7.1 | 8.0 |
| Example 9 | 6.0 | 4.6 | 4.3 | 12.2 | 7.7 | 8.2 |
| Example 10 | 6.2 | 4.9 | 4.2 | 12.2 | 6.5 | 7.4 |
| Example 11 | 5.7 | 4.8 | 4.5 | 12.0 | 7.0 | 8.0 |
| Example 12 | 5.8 | 4.8 | 4.0 | 10.9 | 6.8 | 6.9 |
| Example 13 | 5.9 | 4.9 | 4.7 | 12.1 | 7.0 | 8.1 |
| Example 14 | 5.7 | 4.5 | 4.4 | 10.9 | 7.3 | 7.9 |
| Comparative Example 1 | 5.7 | 4.3 | 4.6 | 12.0 | 7.4 | 8.1 |
| Comparative Example 2 | 5.9 | 4.2 | 4.1 | 11.2 | 6.9 | 8.3 |

As can be seen from Table 2, compared with the one-component adhesive (Comparative Examples 1 and 2) prepared from the polyurethane aqueous dispersion having no or trace (less than 0.02%) tertiary amine groups, the initial peel strength and later peel strength of the one-component adhesive prepared by the aqueous dispersion comprising polyurethane or the polyurethane-urea provided by the present disclosure are equivalent, which satisfy performance requirements without affecting normal use.

(3) Test of Heat Resistance of Composite Materials

Initial heat resistance: the finished sample was hung with a weight of 500 grams and put in an oven at 80° C., and then the length of the sample stretched within 30 minutes was tested.

Later heat resistance: the finished sample was placed at room temperature for 3 days, hung with a weight of 1 kilogram and placed in an oven at 70° C., and then the length of the sample stretched within 24 hours was tested.

The test results are shown in Table 3.

TABLE 3

Heat resistance of adhesives on different substrates

| Composition | Initial heat resistance/mm | | | Later heat resistance/mm | | |
|---|---|---|---|---|---|---|
| material | A | B | C | A | B | C |
| Example 1 | 2 | 2 | 1 | 4 | 3 | 5 |
| Example 2 | 4 | 6 | 3 | 3 | 2 | 1 |
| Example 3 | 6 | 6 | 5 | 4 | 5 | 4 |
| Example 4 | 3 | 2 | 1 | 3 | 3 | 2 |
| Example 5 | 5 | 5 | 6 | 6 | 4 | 5 |
| Example 6 | 5 | 4 | 6 | 5 | 6 | 7 |
| Example 7 | 5 | 6 | 8 | 4 | 5 | 5 |
| Example 8 | 5 | 7 | 5 | 2 | 3 | 1 |
| Example 9 | 2 | 3 | 3 | 1 | 0 | 1 |
| Example 10 | 1 | 2 | 1 | 0 | 1 | 1 |
| Example 11 | 4 | 1 | 2 | 1 | 1 | 0 |
| Example 12 | 6 | 2 | 7 | 2 | 3 | 3 |
| Example 13 | 6 | 5 | 5 | 4 | 5 | 7 |

TABLE 3-continued

Heat resistance of adhesives on different substrates

| Composition | Initial heat resistance/mm | | | Later heat resistance/mm | | |
|---|---|---|---|---|---|---|
| material | A | B | C | A | B | C |
| Example 14 | 5 | 3 | 6 | 2 | 4 | 5 |
| Comparative Example 1 | 8 | 11 | 10 | 14 | 16 | 17 |
| Comparative Example 2 | 7 | 11 | 9 | 13 | 16 | 15 |

As can be seen from Table 3, compared with the one-component adhesive (Comparative Examples 1 and 2) prepared from the polyurethane aqueous dispersion having no or trace (less than 0.02%) tertiary amine groups, the initial heat resistance and later heat resistance of the one-component adhesive prepared by the aqueous dispersion comprising polyurethane or the polyurethane-urea provided by the present disclosure are significantly improved.

(4) Test of Hydrolysis Resistance of Polyurethane Dispersions

If there is a hydrolysis reaction in the system, the molecular weight of polyurethane or polyurethane urea segments decreases, which leads to the deterioration of the initial heat resistance of the substrate bonded with the waterborne polyurethane or polyurethane urea as adhesives. Therefore, the hydrolysis resistance is characterized by the initial heat resistance value under high temperature/normal temperature conditions. The lower the initial heat resistance value, the better the hydrolysis resistance.

High temperature (70° C.) hydrolysis resistance: the aqueous dispersions prepared in each Example and Comparative Example were stored at 70° C. and sampled after 0 day, 3 days, 6 days, 9 days, 12 days, 15 days, 18 days and 21 days, respectively, to test the initial heat resistance level of the sample (which was used as an adhesive) coated on the rubber substrate. The results of the high temperature hydrolysis resistance test are shown in Table 4.

Normal temperature (30° C.) hydrolysis resistance: the aqueous dispersions prepared in each Example and Comparative Example were stored at 30° C. and sampled after 0 day, 30 days, 60 days, 90 days, 120 days, 150 days, 180 days and 210 days, respectively, to test the initial heat resistance level of the sample (which was used as an adhesive) coated on the rubber substrate. The results of the normal temperature hydrolysis resistance test are shown in Table 5.

TABLE 4

Initial heat resistance of adhesives on rubber substrates after storage at high temperature

| Polyurethane dispersion | Initial heat resistance of adhesives on rubber substrates after storage at 70° C./mm | | | | | | | |
|---|---|---|---|---|---|---|---|---|
| | 0 day | 3 days | 6 days | 9 days | 12 days | 15 days | 18 days | 21 days |
| Example 1 | 2 | 3 | 2 | 3 | 4 | 6 | 10 | 13 |
| Example 2 | 4 | 3 | 4 | 5 | 6 | 8 | 14 | 16 |
| Example 3 | 6 | 6 | 5 | 7 | 8 | 11 | 15 | 19 |
| Example 4 | 3 | 2 | 3 | 5 | 7 | 9 | 11 | 15 |
| Example 5 | 5 | 5 | 4 | 5 | 6 | 9 | 17 | 19 |
| Example 6 | 5 | 4 | 5 | 5 | 8 | 9 | 13 | 16 |
| Example 7 | 5 | 5 | 6 | 7 | 9 | 10 | 14 | 18 |
| Example 8 | 5 | 6 | 6 | 8 | 9 | 11 | 13 | 17 |
| Example 9 | 2 | 2 | 3 | 3 | 4 | 6 | 8 | 14 |
| Example 10 | 1 | 2 | 2 | 3 | 3 | 5 | 7 | 12 |
| Example 11 | 4 | 5 | 4 | 6 | 7 | 10 | 13 | 18 |
| Example 12 | 6 | 6 | 7 | 8 | 10 | 13 | 15 | 19 |
| Example 13 | 6 | 6 | 8 | 8 | 11 | 14 | 15 | 21 |
| Example 14 | 5 | 4 | 6 | 7 | 9 | 11 | 14 | 18 |
| Comparative Example 1 | 8 | 12 | 19 | 30 | 43 | 59 | 71 | 88 |
| Comparative Example 2 | 7 | 9 | 16 | 25 | 33 | 49 | 62 | 77 |

TABLE 5

Initial heat resistance of adhesives on rubber substrates after storage at normal temperature

| Polyurethane dispersion | Initial heat resistance of adhesives on rubber substrates after storage at 30° C./mm | | | | | | | |
|---|---|---|---|---|---|---|---|---|
| | 0 day | 30 days | 60 days | 90 days | 120 days | 150 days | 180 days | 210 days |
| Example 1 | 2 | 1 | 2 | 3 | 3 | 4 | 5 | 5 |
| Example 2 | 4 | 3 | 4 | 4 | 5 | 5 | 6 | 7 |
| Example 3 | 6 | 6 | 5 | 7 | 7 | 7 | 8 | 10 |
| Example 4 | 3 | 2 | 3 | 2 | 4 | 5 | 5 | 6 |
| Example 5 | 5 | 5 | 4 | 5 | 6 | 7 | 7 | 9 |
| Example 6 | 5 | 4 | 5 | 5 | 6 | 8 | 8 | 9 |
| Example 7 | 5 | 5 | 6 | 7 | 9 | 8 | 11 | 10 |
| Example 8 | 5 | 6 | 6 | 8 | 7 | 9 | 10 | 11 |
| Example 9 | 2 | 2 | 3 | 3 | 4 | 4 | 6 | 7 |
| Example 10 | 1 | 2 | 2 | 3 | 3 | 3 | 4 | 5 |
| Example 11 | 4 | 5 | 4 | 5 | 6 | 6 | 8 | 9 |
| Example 12 | 6 | 6 | 7 | 7 | 9 | 9 | 11 | 12 |
| Example 13 | 6 | 5 | 6 | 8 | 10 | 10 | 11 | 14 |
| Example 14 | 5 | 5 | 6 | 6 | 7 | 9 | 9 | 12 |
| Comparative Example 1 | 8 | 11 | 15 | 17 | 19 | 25 | 32 | 44 |
| Comparative Example 2 | 7 | 9 | 15 | 16 | 18 | 22 | 28 | 36 |

As can be seen from Table 4 and Table 5, compared with the one-component adhesive (Comparative Examples 1 and 2) prepared from the polyurethane aqueous dispersion having no or trace (less than 0.02%) tertiary amine groups, the high temperature (70° C.) hydrolysis resistance and normal temperature (e.g. 25° C.) hydrolysis resistance of the one-component adhesive prepared by the aqueous dispersion comprising polyurethane or the polyurethane-urea provided by the present disclosure are significantly higher than those of Comparative Examples 1 and 2. This is because the side chain or main chain has segments introduced by the component (a) (i.e. segments having tertiary amine groups), and segments can react with carboxylic acids present in the dispersion system, which can reduce the concentration of acids in the system, eliminate the catalytic effect of carboxylic acids on ester hydrolysis, and thus reduce the hydrolysis of ester bonds in polyurethane or polyurethane-urea polymers. The hydrolysis resistance effect reflected in the initial heat resistance test is that: with the passage of time, the initial heat resistance decreases extremely slowly. However, the polyurethane dispersion prepared in Comparative Example 1 has no structure or group that can eliminate acids, and the irreversible ester hydrolysis reaction will be accelerated due to the action of acidic substances in the system. Hydrolysis will lead to the cracking and fracture of macromolecules, and the hydrolysis resistance effect reflected in the initial heat resistance test is that: with the passage of time, the initial heat resistance decreases rapidly. This shows that the aqueous dispersion comprising polyurethane or polyurethane-urea with tertiary amine groups in the side chain or main chain has excellent hydrolysis resistance. In addition, the content of segments having tertiary amine groups in the side chain or main chain also affects the hydrolysis resistance. For example, the hydrolysis resistance of the adhesive prepared by the polyurethane dispersion of Example 10 is the best, while the hydrolysis resistance of the adhesive prepared from the polyurethane dispersion of Comparative Example 2 is poorer than that of each Example.

The descriptions of the various embodiments of the present disclosure have been presented for purposes of illustration, but are not intended to be exhaustive or limited to the embodiments disclosed. Various modifications and variations will be apparent to those of ordinary skill in the art without departing from the scope and spirit of the described embodiments.

What is claimed is:

1. A hydrolysis-resistant aqueous dispersion comprising polyurethane or polyurethane-urea, wherein the polyurethane or polyurethane-urea comprised in the aqueous dispersion is prepared by reacting raw materials comprising the following components:
   (a) a compound having a tertiary amine group and at least one NCO reactive functional group,
   (b) a polyester polyol having a number average molecular weight of 400 to 5000 and a functionality of 2 to 3,
   (c) an organic compound having at least two isocyanate groups,
   (d) a hydrophilic compound having one or more of an ionic group, a potential ionic group and a non-ionic group and having 2 to 3 NCO reactive functional groups,
   (e) a mono-functional non-ionic hydrophilic compound having at least one NCO reactive functional group,
   (f) optionally, a compound having 1 to 3 NCO reactive functional groups, and
   (g) optionally, a blocking agent in the field of isocyanates or an unsaturated compound having a polymerization reactive group;

wherein based on the total weight of components,
the amount of the component (b) is 70 wt % to 90 wt %;
wherein the polyurethane or polyurethane-urea comprises a structural unit as shown in Formula (I):

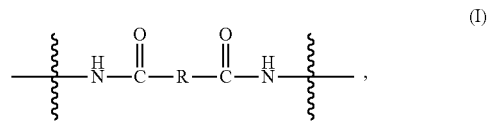

wherein R is selected from a residue of the component (a) after the NCO reactive functional group is removed.

2. The aqueous dispersion comprising polyurethane or polyurethane-urea according to claim 1, wherein based on the total weight of components,
the amount of the component (a) is 0.02 wt % to 5 wt %
the amount of the component (c) is 5 wt % to 40 wt %, preferably 8 wt % to 20 wt %;
the amount of the component (d) is 0.2 wt % to 50 wt %, preferably 1 wt % to 5 wt %;
the amount of the component (e) is 0.01 wt % to 20 wt %, preferably 0.5 wt % to 3 wt %;
the amount of the component (f) is 0 wt % to 10 wt %, preferably 0.5 wt % to 3 wt %; and
the amount of the component (g) is 0 wt % to 15 wt %, preferably 0 wt % to 8 wt %.

3. The aqueous dispersion comprising polyurethane or polyurethane-urea according to claim 1, wherein the NCO reactive functional group is selected from one or more of a primary amino group, a secondary amino group, and a hydroxyl group.

4. The aqueous dispersion comprising polyurethane or polyurethane-urea according to claim 1, wherein
the component (a) is selected from one or more of N-aminoethyl piperazine, N-hydroxyethyl piperazine, N,N-dimethyldipropylenetriamine, N-methyldiethanolamine, N-ethyldiethanolamine, 1,4-bis(aminopropyl) piperazine, N-methylpiperazine, N-ethylpiperazine, and N,N-dimethylethanolamine.

5. The aqueous dispersion comprising polyurethane or polyurethane-urea according to claim 1, wherein the component (b) is selected from a straight chain polyester diol having a number average molecular weight of 400 to 5000 and/or a micro-branched chain polyester diol having a number average molecular weight of 400 to 5000; and/or
the component (c) is selected from diisocyanate and/or polyisocyanate.

6. The aqueous dispersion comprising polyurethane or polyurethane-urea according to claim 1, wherein
the component (d) is selected from one or more of a hydrophilic compound having an ionic group and having 2 to 3 NCO reactive functional groups, a hydrophilic compound having a potential ionic group and having 2 to 3 NCO reactive functional groups, and a hydrophilic compound having a non-ionic group and having 2 to 3 NCO reactive functional groups;
the hydrophilic compound having an ionic group and having 2 to 3 NCO reactive functional groups and/or the hydrophilic compound having a potential ionic group and having 2 to 3 NCO reactive functional groups are selected from one or more of dihydroxycarboxylic acids and salts thereof, trihydroxycarboxylic acids and salts thereof, dihydroxysulfonic acids and salts thereof, trihydroxysulfonic acids and salts thereof, diaminosulfonic acids and salts thereof, triaminosulfonic acids and salts thereof, diaminocarboxylic acids and salts thereof, and triaminocarboxylic acids and salts thereof;

the hydrophilic compound having a non-ionic group and having 2 to 3 NCO reactive functional groups is a polyether diol; and/or the component (e) is selected from one or more of a mono-functional polyethoxy ether having a number average molecular weight of 200 to 8000 and a number of ethylene oxides of 4 to 200; and/or the component (f) is selected from one or more of aliphatic primary monoamines, aliphatic secondary monoamines, alicyclic primary monoamines, alicyclic secondary monoamines, amino alcohols, aliphatic diamines, alicyclic diamines, aliphatic triamines, alicyclic triamines, and hydrazines; and/or the component (g) is selected from one or more of butanone oxime, dimethylpyrazole, caprolactam, malonate, triazole, dimethyltriazole, tert-butyl benzylamine, cyclopentanone carboxyethyl ester, hydroxyethyl acrylate, hydroxyethyl methacrylate, hydroxybutyl acrylate, hydroxybutyl methacrylate, hydroxypropyl acrylate, hydroxypropyl methacrylate, and pentaerythritol triacrylate.

7. The aqueous dispersion comprising polyurethane or polyurethane-urea according to claim 1, wherein the aqueous dispersion comprising polyurethane or polyurethane-urea has a solid content of 15 wt % to 70 wt %;

the aqueous dispersion comprising polyurethane or polyurethane-urea has a pH value of 7.5 to 11; and the aqueous dispersion comprising polyurethane or polyurethane-urea has an average particle size of 20 to nm 750 nm.

8. A method for preparing the aqueous dispersion comprising polyurethane or polyurethane-urea according to claim 1, comprising the following steps:

mixing component (b), component (c), component (e) and optionally component (g) in proportion, and performing polymerization reaction to form an isocyanate-terminated polyurethane prepolymer; subjecting the obtained polyurethane prepolymer, component (d) and optionally component (f) to chain extension reaction, and dispersing the mixture obtained after the chain extension reaction in water or adding water into the mixture obtained after the chain extension reaction for dispersing to obtain an aqueous dispersion comprising polyurethane or polyurethane-urea; wherein the component (d) is a hydrophilic compound having an ionic group or a non-ionic group and having 2 to 3 NCO reactive functional groups; and in the reaction process, the component (a) can be added into the reaction system at any stage for reaction; or mixing component (b), component (c), component (d), component (e) and optionally component (g) in proportion, and performing polymerization reaction to form an isocyanate-terminated polyurethane prepolymer; subjecting the obtained polyurethane prepolymer and a neutralizer to neutralization reaction, dispersing the mixture obtained after the neutralization reaction in water or adding water into the mixture obtained after the neutralization reaction for dispersing, and adding component (a) before, during or after dispersing for further reaction to obtain an aqueous dispersion comprising polyurethane or polyurethane-urea; wherein the component (d) is a hydrophilic compound having a potential ionic group and having 2 to 3 NCO reactive functional groups.

9. A method for preparation an adhesive using the aqueous dispersion comprising polyurethane or polyurethane-urea according to claim 1.

10. The aqueous dispersion comprising polyurethane or polyurethane-urea according to claim 4, wherein the component (a) is selected from one or more of N-aminoethyl piperazine, N-hydroxyethyl piperazine, N,N-dimethyldipropylenetriamine, N-methyldiethanolamine, N-ethyldiethanolamine, and 1,4-bis(aminopropyl) piperazine.

* * * * *